US011778594B2

United States Patent
Dakshinkar et al.

(10) Patent No.: US 11,778,594 B2
(45) Date of Patent: Oct. 3, 2023

(54) OPTIMIZED TRANSMISSIONS USING A-MPDU AND MULTI-VAP FRAMES

(71) Applicant: HEWLETT PACKARD ENTERPRISE DEVELOPMENT LP, Houston, TX (US)

(72) Inventors: Abhiruchi Dakshinkar, Santa Clara, CA (US); Gaurav Patwardhan, Santa Clara, CA (US); Mohd Shahnawaz Siraj, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 242 days.

(21) Appl. No.: 17/062,408

(22) Filed: Oct. 2, 2020

(65) Prior Publication Data
US 2022/0110099 A1 Apr. 7, 2022

(51) Int. Cl.
*H04W 72/04* (2023.01)
*H04B 7/0413* (2017.01)
*H04L 12/46* (2006.01)
*H04L 45/74* (2022.01)

(52) U.S. Cl.
CPC .......... *H04W 72/04* (2013.01); *H04B 7/0413* (2013.01); *H04L 12/4641* (2013.01); *H04L 45/74* (2013.01)

(58) Field of Classification Search
CPC ..... H04W 72/04; H04W 28/04; H04W 76/11; H04W 76/12; H04W 76/14; H04W 84/12; H04B 7/0413; H04L 12/4641; H04L 45/74; H04L 1/1614; H04L 1/1628; H04L 1/0061
See application file for complete search history.

(56) References Cited

U.S. PATENT DOCUMENTS

| | | | |
|---|---|---|---|
| 2014/0112322 A1* | 4/2014 | Ram | H04L 5/0055 370/338 |
| 2018/0020460 A1* | 1/2018 | Hedayat | H04W 72/121 |
| 2019/0045537 A1* | 2/2019 | Seok | H04W 72/10 |
| 2019/0081664 A1* | 3/2019 | Vermani | H04B 7/024 |
| 2019/0150063 A1* | 5/2019 | Chu | H04L 69/22 370/338 |
| 2020/0029376 A1* | 1/2020 | Asterjadhi | H04W 28/04 |
| 2020/0037356 A1* | 1/2020 | Lou | H04W 72/121 |

\* cited by examiner

*Primary Examiner* — Rushil P. Sampat
(74) *Attorney, Agent, or Firm* — Sheppard Mullin Richter & Hampton LLP

(57) ABSTRACT

Systems and methods are provided for aggregating Media Access Control (MAC) Protocol Data Units (MPDUs) destined for different peers, and may have the same or different source address information, e.g., within the same or across different virtual access points (VAPs). For example, trigger frames used to signal to devices which subchannel(s) those devices can utilize, may be aggregated. For example, a multi-VAP/multi-device block acknowledgement for acknowledging packets transmitted to devices belonging to different VAPs can be sent as an aggregated MPDU.

20 Claims, 12 Drawing Sheets

OPTIMIZED TRANSMISSIONS USING A-MPDU AND MULTI-VAP FRAMES

DESCRIPTION OF RELATED ART

In some computing networks, access points (APs) may provide network connectivity to client devices. As density increases in wireless networks, the risk of contention and overlap between transmissions from multiple stations to and from an AP increases. Several approaches have been developed to address these issues through each evolution of wireless communications protocols.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
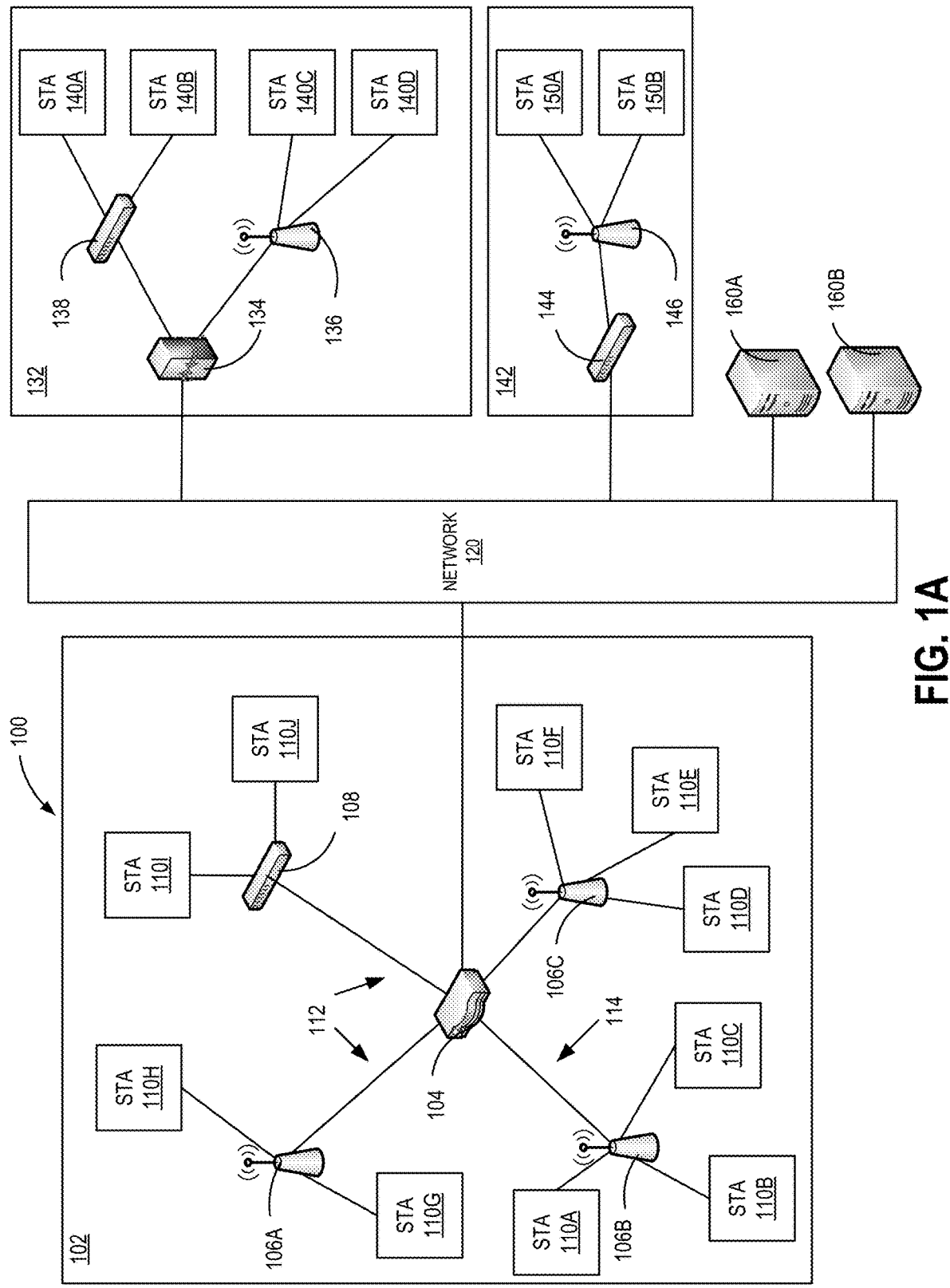
FIG. 1A illustrates an example wireless network deployment in which transmissions using multi-station-associated frames can be utilized in accordance with various embodiments.

The figures are not exhaustive and do not limit the present disclosure to the precise form disclosed.

DETAILED DESCRIPTION

Multi-User, Multiple-Input and Multiple Output (MU-MIMO) provides a mechanism for a wireless network device to transmit to multiple client devices (also referred to as stations (STAB)) at the same time. A wireless network device may be a network device, for example, an AP, that provides wireless connectivity to a network. Without MU-MIMO enabled, the network device may have to transmit to each associated client device one at a time. With MU-MIMO, because the wireless network device is able to transmit to multiple client devices at the same time, the wireless network device is able to transmit more data more frequently. This can improve the rate of data being transmitted to some or all of the associated client devices. MU-MIMO is defined in the Institute of Electrical and Electronics Engineers (IEEE) 802.11 specification. When employing MU-MIMO, a wireless network device may group two or more STAs, and transmit beamformed signals to each group. MU-MIMO may be more efficient when a group of STAs that are to receive MU-MIMO transmissions are receiving frames with similar traffic characteristics. Because the network device is transmitting to all the STAs at the same time, the transmissions may be more efficient when the frames being transmitted are similar in size. Furthermore, the interval between MU-MIMO transmissions may be minimized when the network device receives incoming frames at about the same time.

Orthogonal Frequency Division Multiple Access (OFDMA) is another multi-user (MU) technology, which can involve subdividing a channel into smaller frequency allocations referred to as resource units (RUs). In this way, parallel/simultaneous transmissions and receptions of frames to or from multiple STAs can be achieved respectively. For example, with downlink (DL) OFDMA, a single transmission can be split by frequency within a channel, such that different frames addressed to different STAs use groups of subcarriers. With DL OFDMA transmissions, an AP first contends for a transmission opportunity (as would be understood by those of ordinary skill in the art). The AP may then assemble a number of frames for different STAs, but modulated over the respectively allocated sub-channels. Uplink (UL) OFDMA is achieved in a similar manner, but with multiple STAs transmitting frames simultaneously on different groups of subcarriers within the same channel. To manage UL OFDMA, the AP can transmit trigger frames to indicate which subchannels each STA can use.

Frame aggregation is a feature introduced in 802.11n (and maintained in subsequent versions) of the standard, where two or more data frames are sent in a single transmission. Frame aggregation can help combat the significant amount of overhead associated with each frame that is transmitted by an 802.11 device (which can result in bandwidth consumption that exceeds the payload of a data frame).

APs may advertise wireless local area networks (WLANs) to STAs by sending out beacons and probe responses that contain a WLAN's Service Set Identifier (SSID), as well as, e.g., supported authentication and data rates. When a STA associates to an AP, that STA sends traffic to the AP's Basic SSID (BSSID), which typically is the AP's Media Access Control (MAC) address. In some networks, an AP may use a unique BSSID for each WLAN allowing a single, physical AP to support multiple WLANs. A WLAN configuration applied to a BSSID of an AP can be referred to as an aforementioned VAP. In other words, a VAP may be thought of as a logical AP instance on a physical AP. VAPs or VAP profiles can be configured to provide different network access or services to users on/across the same physical network. For example, a first WLAN may be configured to provide access to guest users and a second WLAN can be configured to provide access to employee users through the same AP(s). Each of the first and second WLAN configurations applied to different BSSIDs result in first and second VAPs. For example, a VAP can be configured to offer open authentication and Captive Portal access with data rates of 1 and 2 Mbps, while another VAP can be configured to require WPA authentication with data rates of up to 11 Mbps.

Typical implementations of frame aggregation, such as MPDU, aggregate MPDUs (into an A-MPDU) that are addressed to the same receiver address. However, because each MPDU has its own, separate MAC header that specifies source and destination addresses, MPDUs from different VAPs, described above, and/or destined for different peers can be combined without issue. Therefore, in accordance with various embodiments, MU transmissions can be effectuated across multiple STAs using newly defined frame types that need not be constrained to a single BSS. For example, in some embodiments, an A-MPDU can be formed by aggregating MPDUs destined for different peers, and may have the same or different source address (SA) information. In some embodiments, trigger frames used to signal, to STAs, which subchannel(s) those STAs can utilize, can be aggregated. In still other embodiments, a multi-VAP/multi-STA block acknowledgement/ACK (BA) for acknowledging packets transmitted to STAs belonging to different VAPs can be sent as an A-MPDU. Further still, because all VAPs share the same AP radio, channel sounding of STAs associated with each VAP of an AP can be performed simultaneously.

Before describing embodiments of the disclosed systems and methods in detail, it is useful to describe an example network installation with which these systems and methods might be implemented in various applications. FIG. 1A illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106A-C. Switches 108 and wireless APs 106A-C provide network connectivity to various client devices/STAs 110A-J. Using a connection to a switch 108 or AP 106A-C, a STA 110A-J may access network resources, including other devices on the (primary site 102) network and the network 120.

As used herein, a client device or STA refers to a device including a processor, memory, and I/O interfaces for wired and/or wireless communication. Examples of STAs may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired STA 110I-J. STAs 110I-J may connect to the switch 108 and through the switch 108, may be able to access other devices within the network configuration 100. STAs 110I-J may also be able to access the network 120, through the switch 108. The STAs 110I-J may communicate with the switch 108 over a wired 112 connection. In the illustrated example, the switch 108 communicates with the controller 104 over a wired 112 connection, though this connection may also be wireless.

Wireless APs 106A-C are included as another example of a point of access to the network established in primary site 102 for STAs 110A-H. Each of APs 106A-C may be a combination of hardware, software, and/or firmware that is configured to provide wireless network connectivity to wireless STAs 110A-H. In the illustrated example, APs 106A-C can be managed and configured by the controller 104. APs 106A-C communicate with the controller 104 and the network over connections 112, which may be either wired or wireless interfaces.

The network 120 may be a public or private network, such as the Internet, or other communication network to allow connectivity among the various sites 102, 130 to 142 as well as access to servers 160A-B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

An AP generally refers to a networking device that allows a client device or STA to connect to a wired or wireless network, in this case, wireless network 100. An AP can include a processor, memory, and I/O interfaces, including wired network interfaces such as IEEE 802.3 Ethernet interfaces, as well as wireless network interfaces such as IEEE 802.11 WiFi interfaces, although examples of the disclosure are not limited to such interfaces. An AP can include memory, including read-write memory, and a hierarchy of persistent memory such as ROM, EPROM, and Flash memory. Moreover, as used herein, an AP may refer to receiving points for any known or convenient wireless access technology which may later become known. Specifically, the term AP is not intended to be limited to IEEE 802.11-based APs.

It should be noted that APs, such as AP 130, AP 132, and AP 134 are enabled to implement VAPs, namely, support for one or more multiple distinct SSID values over a single AP radio with unique media access control (MAC) addresses per SSID (i.e., BSSID). As is known, an SSID is a field between 0 and 32 octets that may be included as an Information Element (IE) within management frames. In the context of the 802.11 standard, management frames supporting the SSID IE include the beacon, probe request/response, and association/reassociation request frames. In one embodiment, an AP supports VAPs using multiple BSSIDs. Each beacon or probe response may contain a single SSID IE. The AP sends beacons for each VAP that it supports at a beacon interval (e.g., 100 ms), using a unique BSSID for each VAP. The AP responds to probe requests for supported SSIDs (including a request for the broadcast SSID) with a probe response including the capabilities corresponding to each BSSID. In one embodiment, an AP may advertise up to a given number (e.g., 16) of beacons, each with a different BSSID to provide the VAP support. Each VAP may have a unique MAC address, and each beacon may have a network name.

Figure 1B:
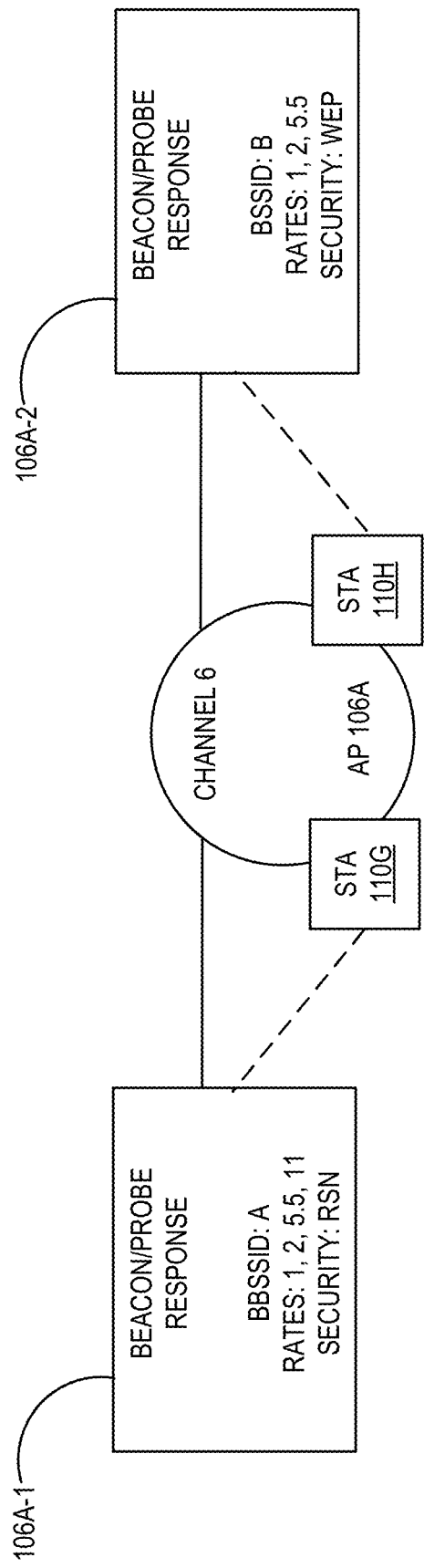
FIG. 1B illustrates an example multi-virtual access point configuration across which transmissions using multi-station-associated frames can be utilized in accordance with various embodiments.

FIG. 1B is a schematic representation of an multi-VAP configured AP. AP 106A may be configured to support multiple VAPs 106A-1 and 106A-2. Each VAP 106A-1 and 106A-2 emulates the operation of physical AP 106A at the MAC layer. In particular, each VAP 106A-1 and 106A-2 emulates the MAC layer behavior of the physical AP 106A by operating with a distinct BSSID (A, B) and, optionally, distinct capability advertisements (e.g., rates 1, 2, 5.5, 11 for BSSID A, and rates 1, 2, 5.5 for BSSID B), and default key sets (RSN for BSSID A and WEP for BSSID B). Each VAP 106A-1 and 106A-2 may also exhibit distinct application behavior (at the application layer), and be reachable via a distinct domain name (at the IP layer). To provide this support, it is assumed that STAs 110G and 110H can discover the SSIDs, that each VAP 106A-1 and 106A-2 can advertise its own set of capabilities, and that each VAP 106A-1 and 106A-2 can be allocated to a unique WLAN. It should be understood that the number of VAPs can differ, and the example of FIG. 1B is not meant to be limiting.

Figure 2:
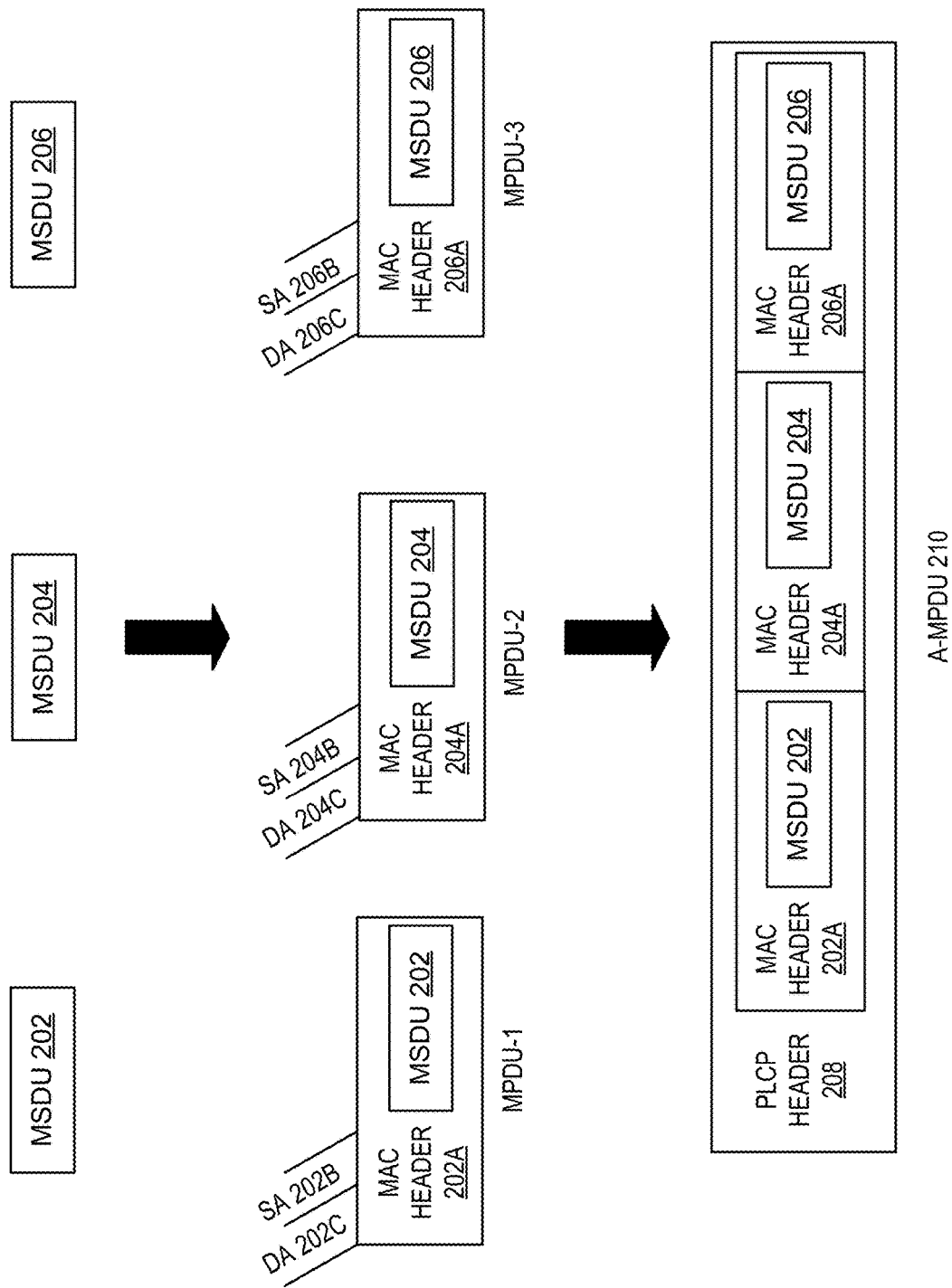
FIG. 2 illustrates the formation of an example aggregated data unit and a corresponding data structure.

FIG. 2 illustrates an example of A-MPDU formation in accordance with one embodiment. A plurality of MAC service data units (MPDUs), e.g., MSDU 202, 204, and 206 are illustrated in FIG. 2. At least one MSDU along with the MAC header can be referred to as an MPDU, or entire 802.11 frame that includes the MAC header, body, and trailer. In turn, multiple MPDUs, in this example, MPDU-1, MPDU-2, and MPDU-3 can be combined to form an A-MPDU 210, which may also include a Physical Layer Convergence Protocol (PLCP) header from which some frame information can be shifted to the MPDU header. PLCP header 208 appends PHY-specific header fields to A-MPDU 210 that contain information used by the PHY layer transmitters and receivers. That is, the MAC layer communications with the PLCP sublayer via primitives (sets of instructive commands/fundamental instructions through a service AP (SAP). Then instructed to do so by the MAC layer, the PLCP prepares MPDUs for transmission.

It should be noted that the data payload of each MPDU, e.g., MPDU-1, MPDU-2, and MPDU-3, may be encrypted separately. The use of A-MPDU can reduce some of the overhead associated with transmitting multiple data frames. Moreover, PLCP information can be transmitted using, typically, the lowest supported data rate, while MPDU information is transmitted using higher data rates, also improving performance. Furthermore, an A-MPDU frame reduced per-frame overhead, and only a single BA can be used to acknowledge an A-MPDU frame.

As alluded to above, traditionally, individual MPDUs within an A-MPDU must each have the same receiver/destination address. In contrast, and in accordance with various embodiments, because each MPDU may have its own header (in the case of FIG. 2, MPDU-1 has a MAC header 202A, MPDU-2 has a MAC header 204A, and MPDU-3 has a MAC header 206A), MPDUs originating from different VAPs and/or destined for different peers/STAs can be combined into an A-MPDU without issue. Thus, a protocol can be defined that has the ability to optimize transmissions in a multi-VAP/co-hosted BSS scenario/environment. That is, and referring again to FIG. 2, destination addresses 202C, 204C, and 206C may differ from one another, e.g., DA 202C and 204C may be the same (i.e., MPDU-1 and MPDU-2 are destined for the same STA), whereas DA 206C is different (i.e., MPDU-3 is destined for a different STA), DA 202C, DA 204C, and DA 206C may all differ from one another, etc. Likewise, SAs 202B, 204B, and 206B may also differ, e.g., each of SAs 202B, 204B, and 206B may each refer to a different source STA, SAs 202B and 206B may be the same, but SA 204B may differ from SAs 202B/206B, and so on. It should be understood that A-MPDU 210 illustrates an aggregate of three MPDUs, but A-MPDUs are not necessarily limited in terms of the number of MPDUs that may be combined. An A-MPDU may be a combination of two MPDUs, six MPDUs, etc. as long as limits mentioned in the standards are met.

Figure 3A:
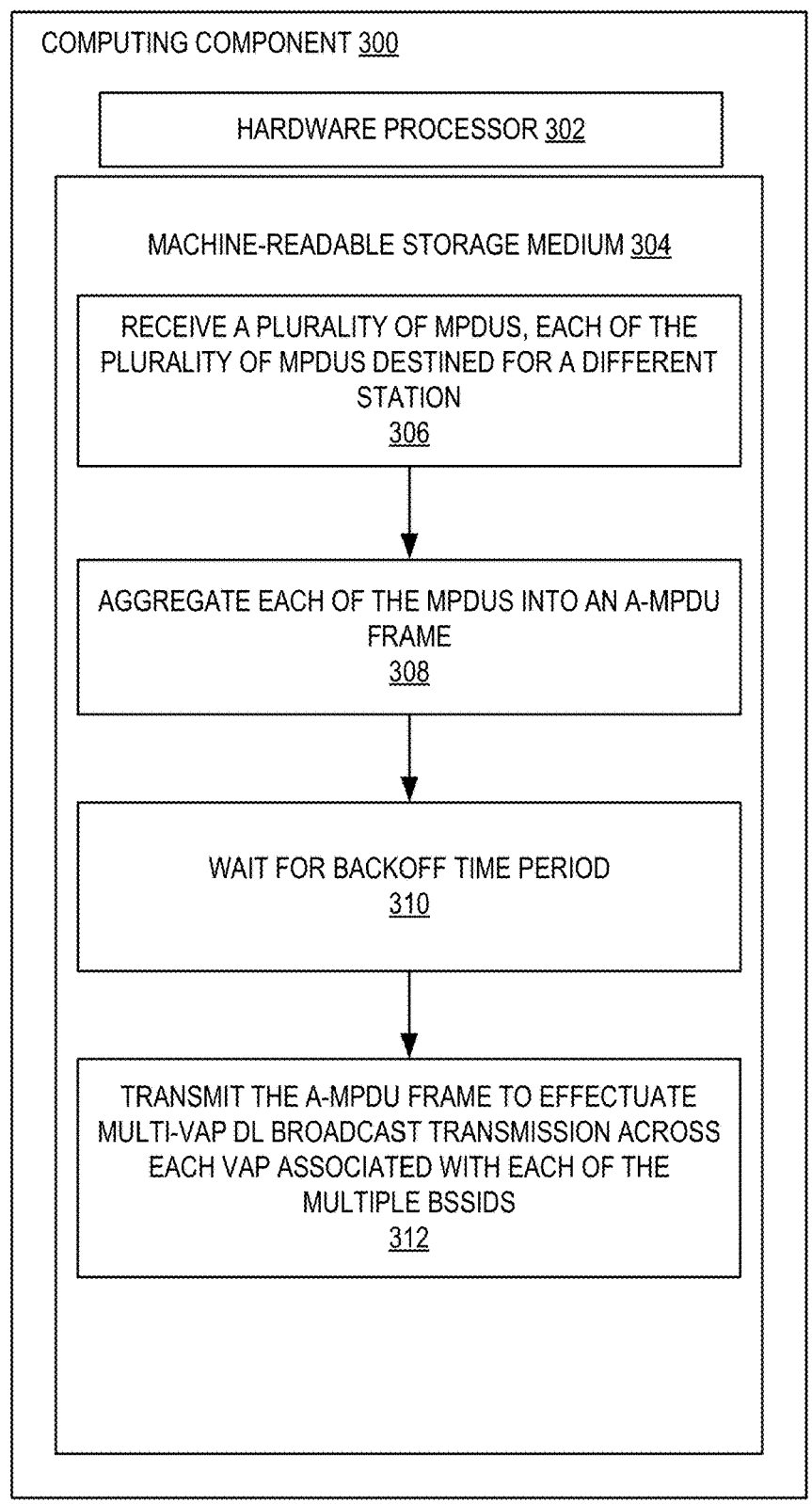
FIG. 3A illustrates an example computing component for effectuating multi-station/multi-destination transmissions in accordance with one embodiment.

FIG. 3A is a block diagram of an example computing component or device 300 for aggregating transmissions in accordance with one embodiment. Computing component 300 may be, for example, a server computer, a controller, or any other similar computing component capable of processing data. In the example implementation of FIG. 3A, computing component 300 includes a hardware processor, 302, and machine-readable storage medium, 304. In some embodiments, computing component 300 may be an embodiment of a controller, e.g., a controller such as controller 104 (FIG. 1A), or another component of wireless network 100, e.g., an AP such as AP 106A (FIG. 1A), for example.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-312, to control processes or operations for an AP. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-312.

As noted above, hardware processor 302 may control processes/operations for an AP. An AP as also noted above may be an AP configured to operate as/with multiple VAPs or BSSIDs. Hardware processor 302 may execute instruction 306 to receive a plurality of MPDUs, each of the plurality of MPDUs destined for a different STA. For example, at the MPDU layer, an AP, such as AP 160*a* (FIG. 1A), may receive MPDU frames to be transmitted to two or more STAs. For example, STA 110G may wish to transmit data to another STA, e.g., STA 110A, while STA 110H may wish to transmit data to STA 110D. In this particular example, STA 110G is associated to a first VAP of AP 106A, i.e., VAP 106A-1, while STA 110H is associated to a second VAP of AP 106A, i.e., VAP 106A-2.

Hardware processor 302 may execute instruction 308 to aggregate each of the MPDUs into an A-MPDU frame. As described above with regard to FIG. 2, multiple MPDUs may be aggregated into an A-MPDU. Because each MPDU may have its own specific MAC header, the corresponding MAC header of each MPDU, despite current 802.11 requirements, need not have the same destination, i.e., be destined for the same STA. Thus, the MAC header of each MPDU making up the A-MPDU may comprise different destination addresses. The same holds true for the source addresses, where the source address of each MPDU is representative of the VAP/BSSID to which a STA is associated.

Hardware processor 302 may execute instruction 310 to wait for some backoff time period, such as an arbitration inter-frame spacing (AIFS) time period. AIFS refers to a method of prioritizing one (access) category of traffic/data over another, e.g., voice traffic over email. An AIFS time period refers to an amount of time an AP should wait before contending to transmit a subsequent frame.

Hardware processor 302 may execute instruction 312 to transmit the A-MPDU frame to effectuate multi-VAP DL broadcast transmission across each VAP associated with each of the multiple BSSIDs. In this way, multiple frames can be sent to multiple destination STAs simultaneously, and may involve frames originating from different VAPs/BSSIDs. Thus, the constraint set forth by the 802.11 standard (as currently specified) that requires each MPDU making up an A-MPDU has the same destination address and the same source address amongst the MPDUs can be avoided. It should be understood that the acknowledgement (ACK) policy for each MPDU can follow that used in DL MU transmissions, and need not change to accommodate this newly disclosed multi-VAP/multi-STA A-MPDU frame. In the event a particular MPDU within an A-MPDU does not apply or is not destined for a particular STA (by virtue of the destination address not being that of the receiving STA, for example), that STA may simply ignore the received MPDU.

Figure 3B:
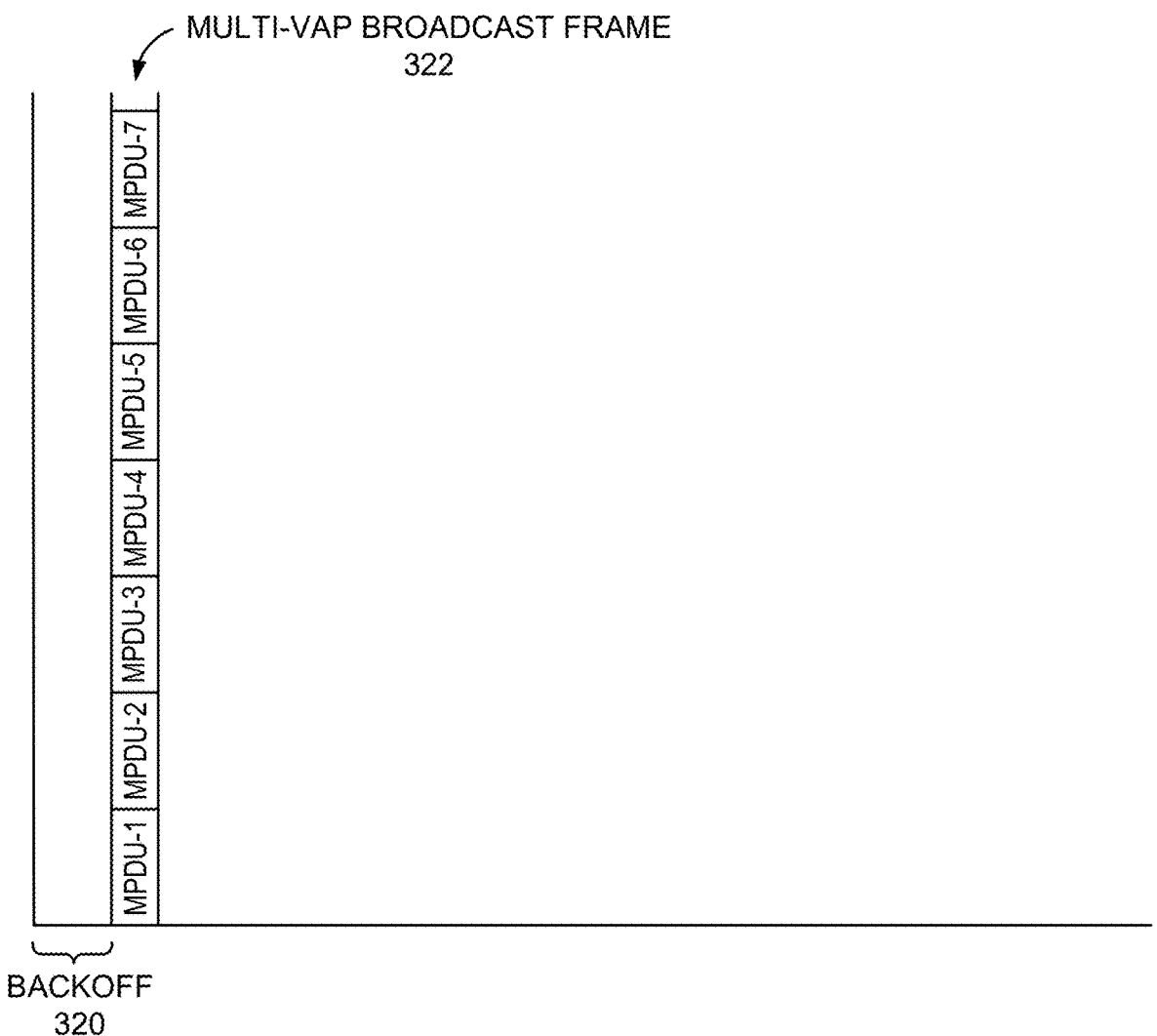
FIG. 3B illustrates an example of downlink broadcast transmission across multiple virtual access points using an aggregated data unit transmission frame in accordance with one embodiment.

FIG. 3B is a graphical representation of a DL broadcast transmission for which the aforementioned multi-VAP/multi-STA A-MPDU mechanism can be applied. As noted above, multiple MPDU frames can be aggregated into an A-MPDU. In this example, multiple broadcast frames across a plurality of VAPs may be aggregated into a A-MPDU frame. As also noted above, between the transmission of neighboring A-MPDU frames, an AP waits for a backoff time period, e.g., backoff 320. After waiting for the appropriate time, the AP may broadcast, in this example, a multi-VAP A-MPDU frame to a plurality of different MPDUs (e.g., MPDU-1, MPDU-2, . . . MPDU-7). According to the 802.11 standard, the ACK policy may comprise specifying that no ACK be sent for broadcast/multicast frames. Thus, the AP need not wait to receive an ACK from any of the STAs to which the multi-VAP A-MPDU frame 322 was broadcast. Such DL broadcast transmission of a multi-VAP/multi-STA A-MPDU frame can occur subsequent to a delivery traffic indication map (DTIM) beacon that informs STAs of buffered multi-cast/broadcast data at the AP. In this way, channel access time by each VAP can be reduced/saved.

Figure 4A:
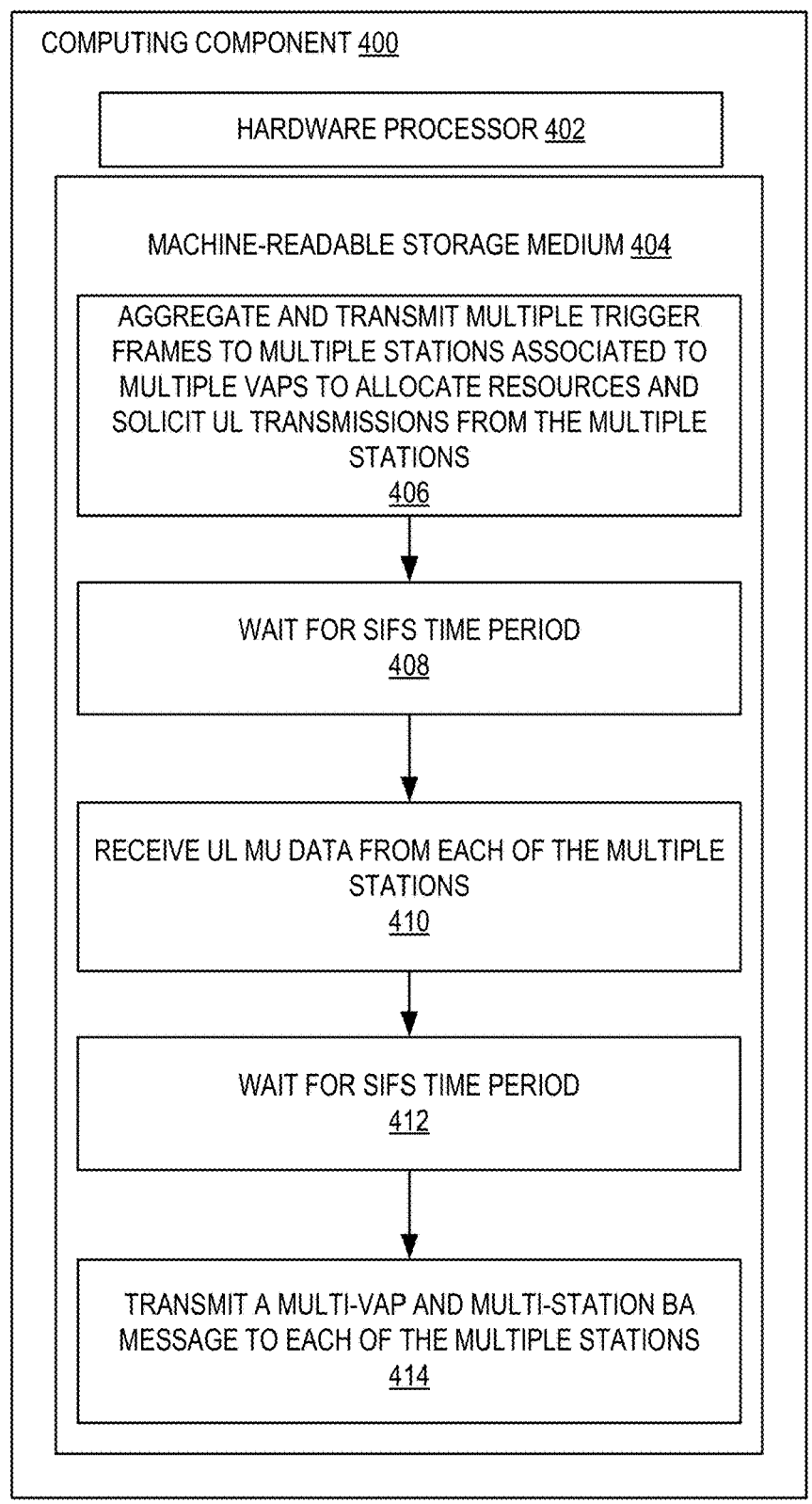
FIG. 4A illustrates an example computing component for effectuating multi-station trigger frame transmissions for receipt of uplink data across multiple virtual access points in accordance with various embodiments.

FIG. 4A is a block diagram of an example computing component or device 400 for aggregating transmissions in accordance with one embodiment. Computing component 400 may be, for example, a server computer, a controller, or any other similar computing component capable of processing data. In the example implementation of FIG. 4A, computing component 400 includes a hardware processor, 402, and machine-readable storage medium, 404. In some embodiments, computing component 400 may be an embodiment of a controller, e.g., a controller such as controller 104 (FIG. 1A), or another component of wireless network 100, e.g., an AP such as AP 106A (FIG. 1A), for example.

Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-416, to control processes or operations for an AP. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-416.

As noted above, hardware processor 402 may control processes/operations for an AP. An AP as also noted above, may be an AP configured to operate as/with multiple VAPs or BSSs. Hardware processor 402 may execute instruction 406 to aggregate and transmit multiple trigger frames to multiple STAs associated to multiple VAPs to allocate resources and solicit UL transmissions from the multiple STAs. It should be noted that for scheduling trigger-based UL transmissions, an AP sends a trigger frame. This trigger frame can be a broadcast frame which contains information about those STAs which are part of a UL multi-user group. The trigger frame may also contain information regarding the time when the STAs are going to begin transmitting data/packets/frames to the AP, along with information about the transmit rate, transmit power, resource unit (RU) size and spatial streams/subchannels allocated to each STA. The source address (SA) in a trigger frame refers to the BSSID of the VAP transmitting the trigger frame. Because an AP, in accordance with various embodiments, groups the clients (STAs) of multiple VAPs, the AP sends multiple trigger frames for each VAP.

The STAs are supposed to respond within a Short Interframe Space (SIFS) interval after receiving the trigger frame. Accordingly, hardware processor 402 may execute instruction 408 to wait for a SIFS time period. If the AP were to send multiple trigger frames from each VAP in a conventional, single-user fashion, the UL transmission from each of the STAs would collide with the subsequent trigger frames. That is not the case here.

Hardware processor 402 may execute instruction 410 to receive UL MU data from each of the multiple STAs, e.g., UL OFDMA or UL MU-MIMO data. As will be discussed below with reference to FIG. 4B, UL MU data can be sent after receipt of a multi-VAP A-MPDU frame representative of aggregated trigger frames, and subsequent to a SIFS interval.

Hardware processor 402 may execute instruction 412 to wait for another SIFS time period. In this instance, the SIFS time period is a required time period between data and ACK frames. Thus, hardware processor 402 may execute instruction 414 to transmit a multi-VAP/multi-STA BA message to each of the multiple STAs. It should be understood that a single, multi-STA BA cannot be used in response to a UL MU transmission across multiple VAPs because the single, multi-STA BA frame only has a single source address field, and therefore could not accommodate the multi-VAP nature of such a multi-VAP/multi-STA BA.

Figure 4B:
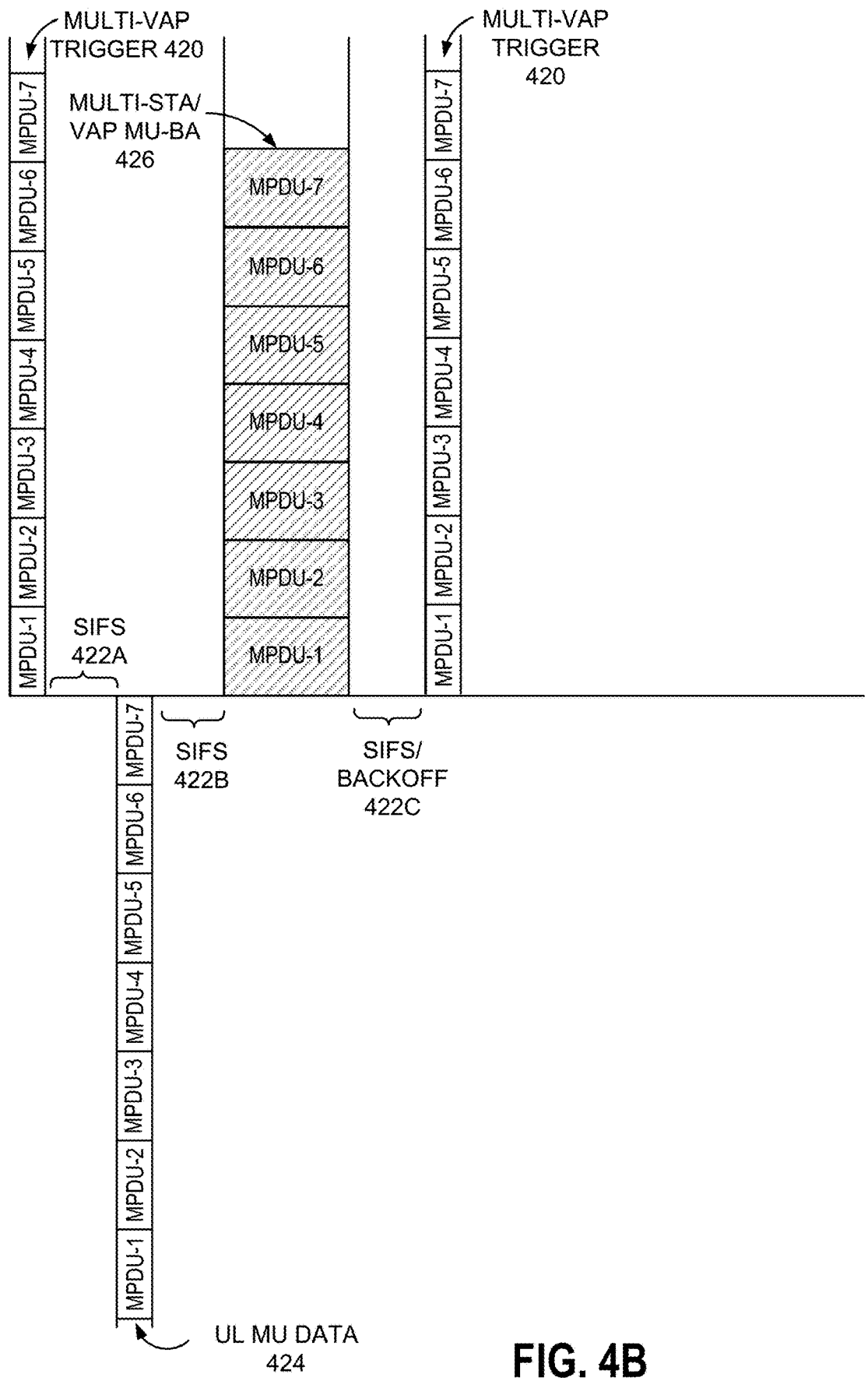
FIG. 4B illustrates an example of uplink unicast transmission across multiple virtual access points using an aggregated data unit transmission frame in accordance with one embodiment.

FIG. 4B is a graphical representation of a UL unicast transmission scenario in which a multi-VAP trigger A-MPDU frame can be used to trigger the transmission of data from multiple STAs across multiple VAPs of the same AP. As discussed above, a plurality of trigger frames from multiple VAPs of an AP may be aggregated into a multi-VAP trigger A-MPDU frame. The multi-VAP trigger A-MPDU frame 420 can be transmitted to the requisite STAs for which the MPDUs making up the multi-VAP trigger A-MPDU frame are intended. As noted above, according to the 802.11 standard, STAs are supposed to respond within a SIFS interval after receiving the trigger frame. As illustrated in FIG. 4B, subsequent to receiving the multi-VAP trigger A-MPDU frame 420, and within a SIFS interval 422A, each of the triggered STAs may send a UL MU (e.g., UL OFDMA or MU-MIMO) data frame 424 to the AP. Again, the multi-VAP trigger frame 420 provides each STA with the requisite information according to which the UL MU data frame 424 may be sent.

After the transmission of UL MU data frame 424, another SIFS interval 422B commences, within which the AP may send a multi-VAP/multi-STA (aggregated) MU BlockAck (BA) 426. It should be understood that this disclosed mechanism can be used to various types of trigger frames, including but not limited to, buffer status report (BRSP) triggers, MU request to send (RTU) triggers, basic triggers, MU-BA request (BAR) triggers, etc.

Figure 5A:
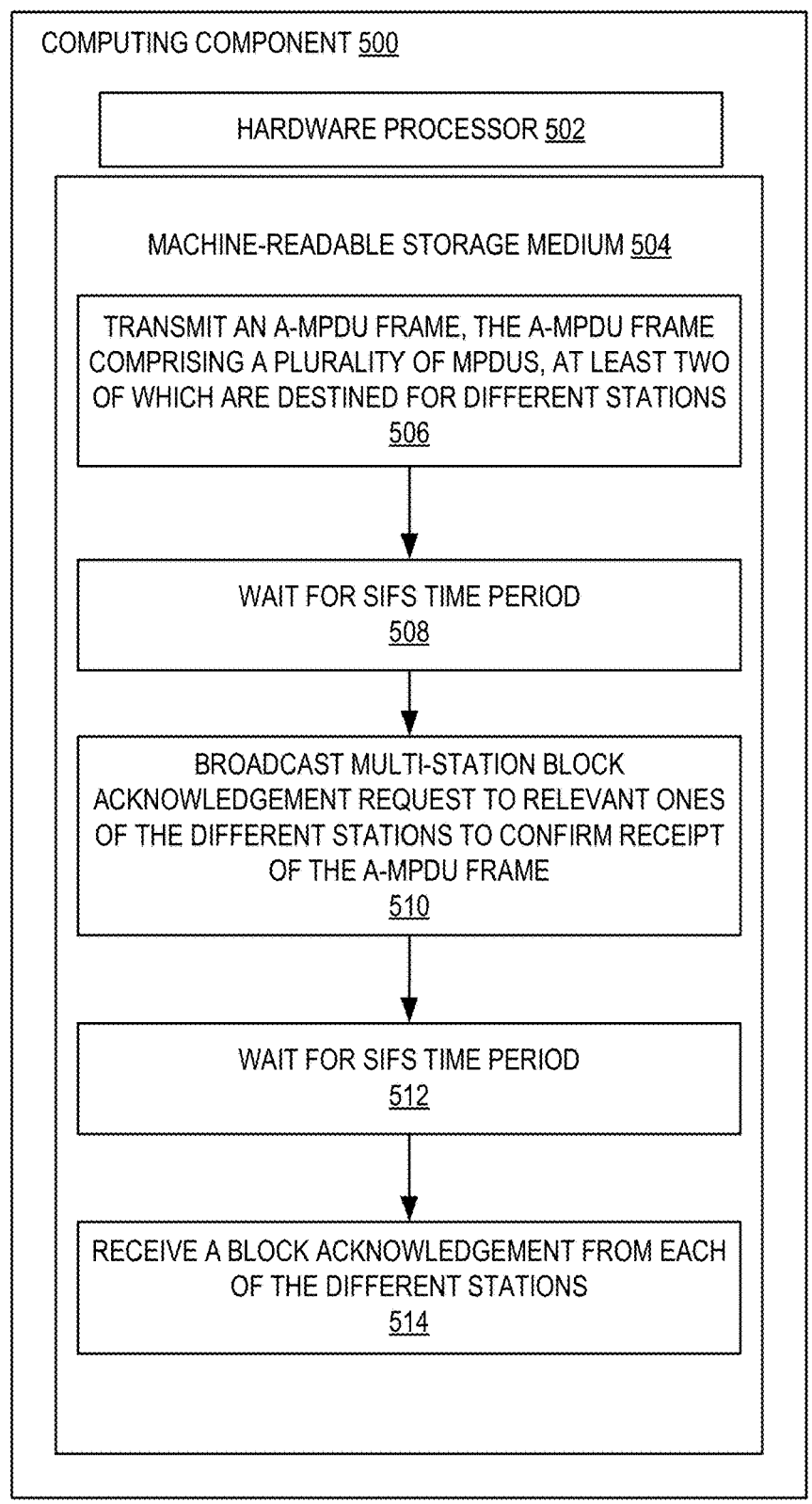
FIG. 5A illustrates an example computing component for effectuating multi-station block acknowledgement transmissions in accordance with various embodiments.

FIG. 5A is a block diagram of an example computing component or device 500 for aggregating transmissions in accordance with one embodiment. Computing component 500 may be, for example, a server computer, a controller, or any other similar computing component capable of processing data. In the example implementation of FIG. 5A, computing component 500 includes a hardware processor, 502, and machine-readable storage medium, 504. In some embodiments, computing component 500 may be an embodiment of a controller, e.g., a controller such as controller 104 (FIG. 1A), or another component of wireless network 100, e.g., an AP such as AP 106A (FIG. 1A), for example.

Hardware processor 502 may be one or more central processing units (CPUs), semiconductor-based microprocessors, and/or other hardware devices suitable for retrieval and execution of instructions stored in machine-readable storage medium, 504. Hardware processor 502 may fetch, decode, and execute instructions, such as instructions 506-514, to control processes or operations for an AP. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-512.

As noted above, hardware processor 502 may control processes/operations for an AP. An AP as also noted above, may be an AP configured to operate as/with multiple VAPs or BSSs. Hardware processor 502 may execute instruction 506 to transmit an A-MPDU frame, the A-MPDU frame comprising a plurality of MPDUs, at least two of which are destined for different STAs. For example, at the MPDU layer, an AP, such as AP 160a (FIG. 1A), may receive MPDU frames to be transmitted to two or more STAs. For example, STA 110G may wish to transmit data to another STA, e.g., STA 110A, while STA 110H may wish to transmit data to STA 110D. In this particular example, STA 110G is associated to a first VAP of AP 106A, i.e., VAP 106A-1, while STA 110H is associated to a second VAP of AP 106A, i.e., VAP 106A-2. Prior to transmission of such a DL A-MPDU frame to the multiple stations, the AP may wait for a specified backoff time period along with a specified backoff period.

Hardware processor 502 may execute instruction 508 to wait for a SIFS time period. As noted above, STAs are supposed to respond within a SIFS interval after receiving a data frame and prior to receipt of a BA. Thus, hardware processor 502 may execute instruction 510 to transmit or broadcast a multi-STA/multi-VAP MU BA request (BAR) to confirm receipt of the A-MPDU frame to the relevant STAs. Hardware processor 502 may execute instruction 512 to wait for another SIFS time period or interval prior to executing instruction 514 to receive a BA, e.g., an UL MU BA.

Figure 5B:
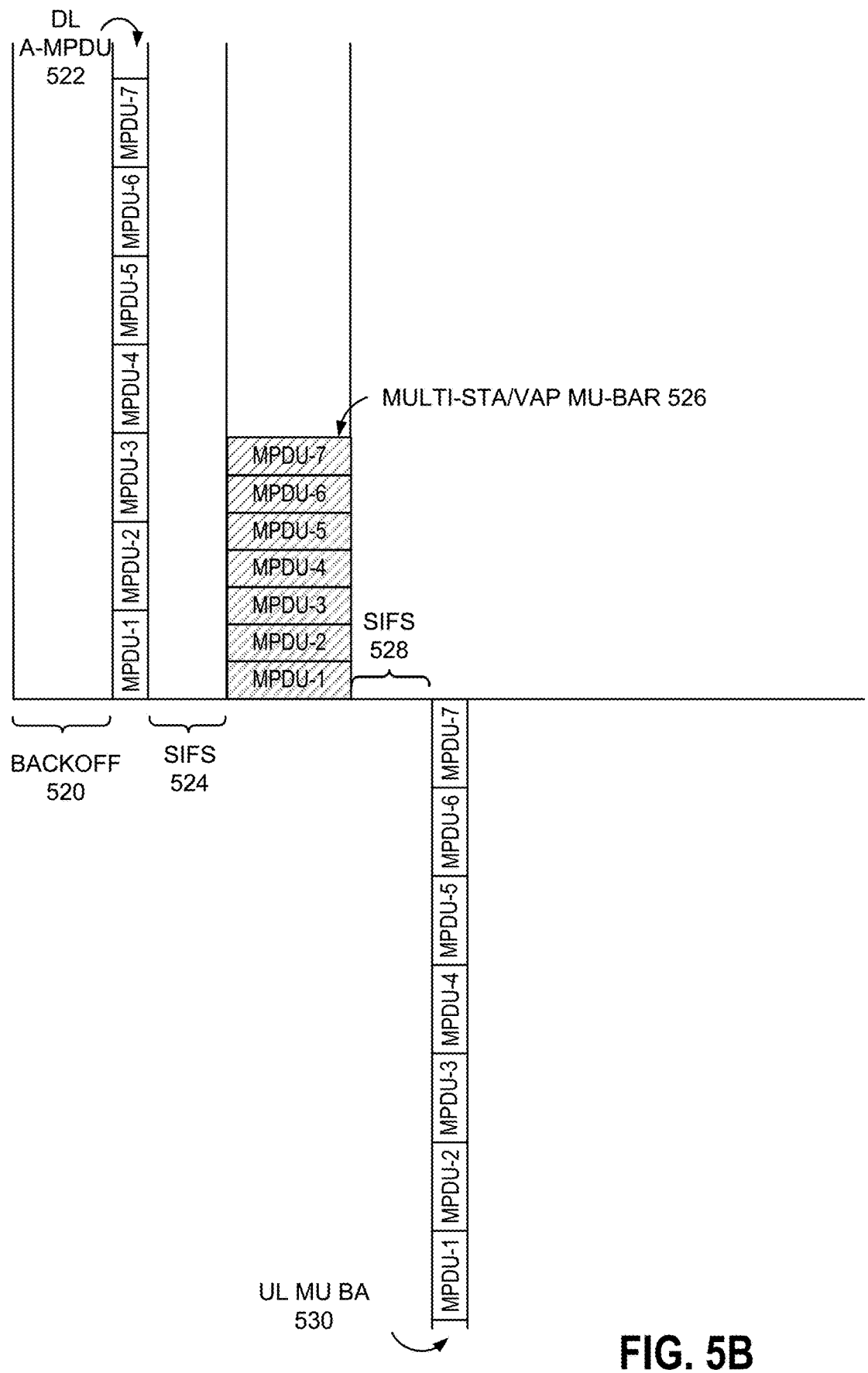
FIG. 5B illustrates an example of downlink unicast transmission across multiple virtual access points using an aggregated data unit transmission frame in accordance with one embodiment.

FIG. 5B is a graphical representation of an example DL unicast transmission using multi-STA A-MPDUs, multi-VAP/multi-STA BARs/BAs. As illustrated in FIG. 5B, subsequent to a backoff period 520, a DL A-MPDU frame 522 can be transmitted, the DL A-MPDU frame 522 comprising MPDU frames for multiple STAs which may or may not be attached to the same VAP. It should be noted that different backoff parameters/values can be set in accordance with different access categories associated with the backoff time period, e.g., AIFS interval. In some scenarios, a DL MU-MIMO transmission may be the more MAC-efficient approach to MU transmissions. However, when STAs cannot be grouped based on, e.g., a sounding matrix, DL unicast transmissions using multi-STA A-MPDUs can be more efficient for higher bandwidth applications where DL OFDMA is suboptimal. For example, deep frequency selective fading may also occur during a DL OFDMA PPDU in which case, a channel will be flat for an A-MPDU based transmission.

With a SIFS time period 524, an aggregated multi-STA/multi-VAP MU-BAR frame 526 can be sent by the AP to each of the destination/target STAs (commensurate with the DL-A-MPDU frame 522 sent to those STAs). It should be understood that the 802.11 standard allows for an MU-BAR to have a single source address, which corresponds to the relevant VAP. If an AP wishes to obtain an acknowledgement from STAs which are connected to different VAPs, the AP may combine MU-BARS from multiple VAPs in the form an aggregated multi-STA/multi-VAP A-MPDU. Pursuant to another SIFS time period 528, the AP may receive aggregated UL OFDMA BA 530 from the STAs.

Figure 6A:
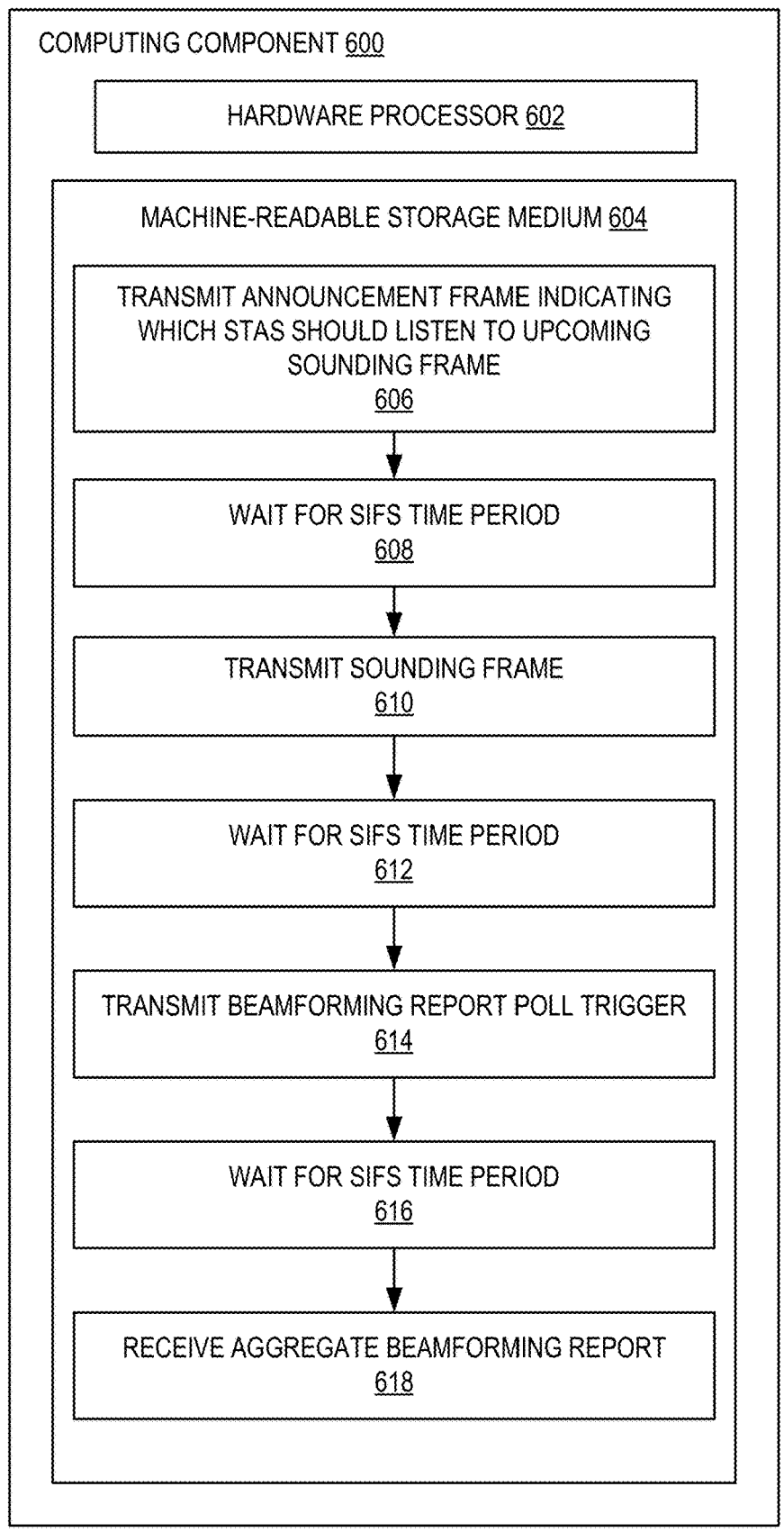
FIG. 6A illustrates an example computing component for effectuating multi-VAP sounding in accordance with various embodiments.

FIG. 6A is a block diagram of an example computing component or device 600 for aggregating transmissions in accordance with one embodiment. Computing component 600 may be, for example, a server computer, a controller, or any other similar computing component capable of processing data. In the example implementation of FIG. 6A, computing component 600 includes a hardware processor, 602, and machine-readable storage medium, 604. In some embodiments, computing component 600 may be an embodiment of a controller, e.g., a controller such as controller 104 (FIG. 1A), or another component of wireless network 100, e.g., an AP such as AP 106A (FIG. 1A), for example.

Hardware processor 602 may be one or more central processing units (CPUs), semiconductor-based microprocessors, and/or other hardware devices suitable for retrieval and execution of instructions stored in machine-readable storage medium, 604. Hardware processor 602 may fetch, decode, and execute instructions, such as instructions 606-618, to control processes or operations for an AP. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-618.

As noted above, hardware processor 602 may control processes/operations for an AP. An AP as also noted above, may be an AP configured to operate as/with multiple VAPs or BSSs. Hardware processor 602 may execute instruction 606 to transmit an announcement frame indicating which STAs should listen to an upcoming sounding frame. As noted above, APs can use a process referred to as beamforming to focus transmission energy towards a particular receiver, e.g., STA. Beamforming may depend on channel calibration procedures referred to as channel sounding in the 802.11 standard. Channel sounding (or simply sounding) can refer to a process/mechanism for determining how to radiate energy in a preferred direction (how to beamform). As specified in the 802.11n standard, null data packet (NDP) sounding has been specified as the method of beamforming to be followed. Thus, the announcement frame may comprise a NDP announcement (NDPA) frame, which can identify those STAs that should listen to a subsequent/following sounding frame, along with the dimensions of that frame (depending on, e.g., the number of antennas the AP may have, the number of spatial streams in use, etc.).

Hardware processor 602 may execute instruction 608 to wait for a SIFS time period, after/during which hardware processor 602 may execute instruction 610 to transmit the sounding frame. For example, the AP may send a NDP frame (why may be a PHY packet) to determine channel parameters between the AP and the STA(s). The NDP allows a receiver/STA to analyze OFDM training fields to calculate a channel response. That is, the receiver/STA analyzes the training fields of the received NDP and calculates a feedback matrix, which can in turn, be used by the AP to calculate an applicable steering matrix to direct transmissions towards that receiver/STA.

Hardware processor 602 may execute instruction 612 to wait for another SIFS time period, after/during which hardware processor 602 may execute instruction 614 to transmit a beamforming report poll trigger. To retrieve a feedback matrix from each beamformee (STA) beyond the first STA, the beamforming report poll trigger or frame, which is a control frame, can be transmitted so that feedback from the second and subsequent STAs/beamformees can be retrieved. The beamforming report poll trigger can comprise a field of retransmission requests, each bit in the field requesting one feedback segment to be retransmitted.

Hardware processor 602 may execute instruction 616 to wait for yet another SIFS time period, after/during which hardware processor 602 may execute instruction 618 to receive a UL MU frame comprising a plurality of aggregated beamforming reports from the STAs identified in the announcement frame.

Figure 6B:
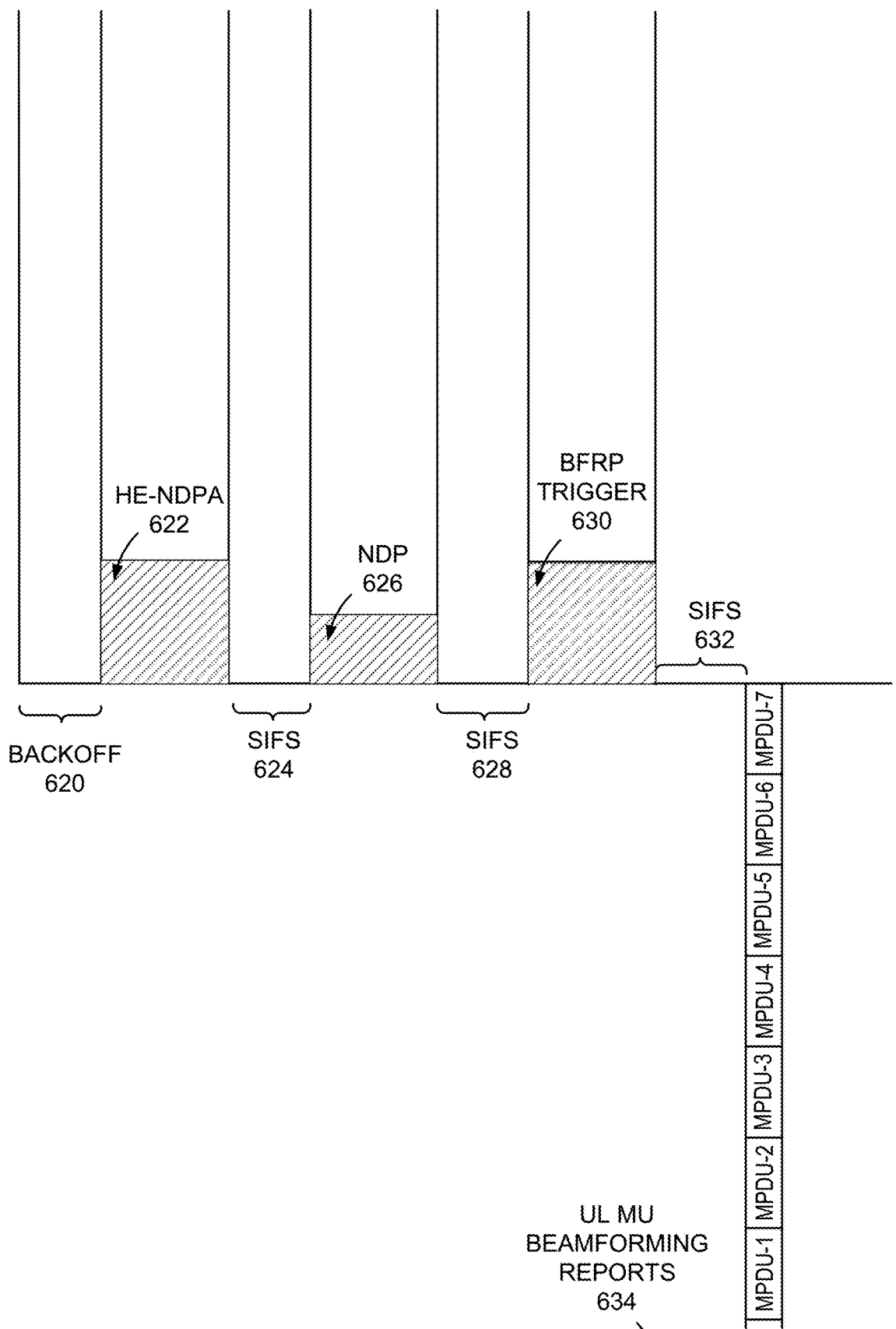
FIG. 6B illustrates an example of sounding across multiple virtual access points using an aggregated data unit transmission frame in accordance with one embodiment.

FIG. 6B is a graphical representation of an example multi-VAP sounding scenario. As described above with regard to FIG. 6A, sounding is performed as part of channel calibration to support beamforming. Subsequent to a specified backoff period 620, where as noted above, the backoff may be set according to access category/data traffic type to be transmitted/received. A NDPA frame 622 may be transmitted by the AP to the STAs for which the AP wishes to receive feedback in order to effectuate beamforming. In some embodiments, as illustrated in FIG. 6B, the NDPA frame 622 may be a high efficiency (HE) NDPA frame. Again, the HE-NDPA frame 622 may identity target STAs and frame dimensions. Following/during a SIFS interval 624, the AP may send the actual NDP frame 626. It should be understood that HE-NDPA is introduced as part of the HE sounding protocol introduced in the 802.11ax standard. The HE-NDPA and VHT-NDPA frame formats are the same except for the "Sounding Dialogue Token" field which specifies VHT/HE sounding. The HE sounding protocol includes HE-NDPA, NDP, and BFRP frames, where the HE-NDPA and BSRP frames can be aggregated in accordance with various embodiments. It should be noted that NDP packets does not have a MAC header or body, whereas NDPA and BFRP frames do have MAC headers. If sounding feedback from multiple STAs associated to different VAPs is desired, the NDPA and BFRP frames of different VAPs can be aggregated (not illustrated for ease of reference in FIG. 6B).

Following/during another SIFS interval 628, the AP may transmit a BFRP trigger or frame 630 in order to request and obtain a compressed beamforming report from each STA, whether the STAs are associated to the same or different VAP(s). Following/during still another SIFS interval 632, the UL MU beamforming reports 634 from each identified STA can be transmitted and received by the AP.

Figure 7:
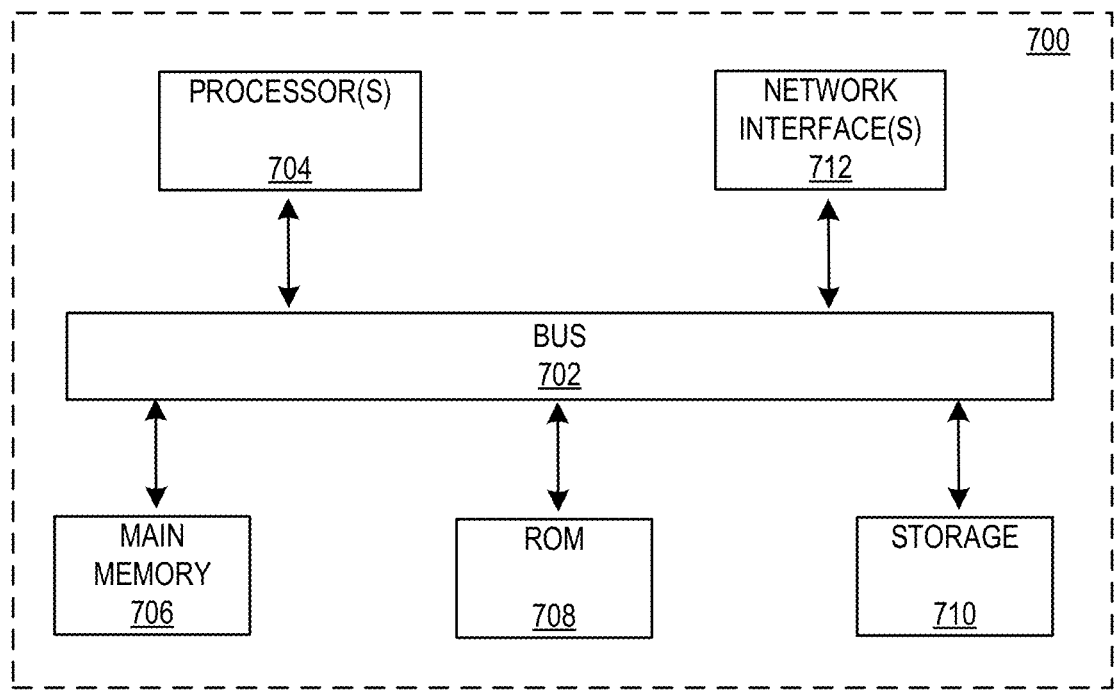
FIG. 7 illustrates an example computing component in which various embodiments described herein may be implemented.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 300 may further include at least one network interface 712, such as a network interface controller (NIC), network adapter, or the like, or a combination thereof, coupled to bus 702 for connecting computer system 700 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. An access point (AP) configured with multiple base service set identifiers (BSSIDs), comprising:
   a processor; and
   a memory operatively connected to the processor, and including computer code that when executed, causes the processor to:
      receive a plurality of Media Access Control (MAC) protocol data units (MPDUs), each of the plurality of MPDUs destined for a different station, and each of the plurality of MPDUs having a distinct MAC header specifying source and destination addresses, the destination addresses corresponding to each of the different stations to which each of the plurality of MPDUs is destined;
      aggregate each of the MPDUs into an aggregate MPDU (A-MPDU) frame; and
      transmit the A-MPDU frame in accordance with the distinct MAC header of each of the plurality of MPDUs to effectuate multi-virtual AP (multi-VAP) downlink transmission across each VAP associated with each of the multiple BSSIDs.

2. The AP of claim 1, wherein the computer code that when executed causes the processor to aggregate each of the MPDUs into the A-MPDU frame further causes the processor to reflect destination addresses for each of the different stations-associated with each of the MPDUs.

3. The AP of claim 1, wherein the computer code that when executed causes the processor to aggregate each of the MPDUs into the A-MPDU frame further causes the processor to reflect source addresses, associated with each of the MPDUs, for each VAP from which the plurality of MPDUs are transmitted.

4. The AP of claim 1, wherein the multi-virtual AP (multi-VAP) downlink transmission across each VAP associated with each of the multiple BSSIDs comprises a multi-VAP broadcast transmission.

5. The AP of claim 1, wherein the multi-virtual AP (multi-VAP) downlink transmission across each VAP associated with each of the multiple BSSIDs comprises a multi-VAP unicast transmission.

6. An access point (AP) configured with multiple base service set identifiers (BSSIDs), comprising:
   a processor; and
   a memory operatively connected to the processor, and including computer code that when executed, causes the processor to:
      aggregate and transmit multiple trigger frames to multiple stations associated to multiple virtual APs (VAPs) identified by respective ones of the multiple BSSIDs to allocate resources and solicit uplink (UL) transmissions from the multiple stations, each of the aggregated and transmitted multiple trigger frames including source addresses corresponding to each of the multiple BSSIDs;
      receive UL data from each of the multiple stations at each of the multiple VAPs in accordance with the source addresses; and
      transmit a multi-VAP and multi-station block acknowledgement (BA) message to each of the multiple stations across each of the multiple VAPs.

7. The AP of claim 6, wherein the memory includes computer code that when executed further causes the processor to wait for initiation of a SIFS time period prior to the transmission of the multi-VAP and multi-station BA.

8. The AP of claim 6, wherein the computer code that when executed causes the processor to aggregate and transmit the multiple trigger frames as an aggregate Media Access Control (MAC) protocol data unit (A-MPDU) frame.

9. The AP of claim 6, wherein the computer code that when executed causes the processor to receive the UL data from each of the multiple stations, receives the UL data as a UL MU transmission.

10. The AP of claim 6, wherein the computer code that when executed causes the processor to receive the UL data from each of the multiple stations, receives the UL data as a UL Multiple Input Multiple Output (MIMO) transmission.

11. The AP of claim 6, wherein the memory includes computer code that when executed further causes the processor to transmit the multi-VAP and multi-station BA message as an A-MPDU frame.

12. An access point (AP) configured with multiple base service set identifiers (BSSIDs), comprising:
   a processor; and
   a memory operatively connected to the processor, and including computer code that when executed, causes the processor to:
      transmit an aggregate Media Access Control data unit (A-MPDU) frame, the A-MPDU frame comprising a plurality of MPDUs, at least two of which are destined for different stations, each of the plurality of MPDUs having a distinct MAC header specifying source and destination addresses, the destination addresses including destination addresses corresponding to each of the different stations to which the at least two of the plurality of MPDUs are destined;
      transmit a multi-VAP multi-station block acknowledgement request (BAR) message to each of the different stations to confirm receipt of the A-MPDU frame in accordance with the distinct MAC header of each of the plurality of MPDUs; and
      receive a BA from each of the different stations.

13. The AP of claim 11, wherein the computer code that when executed causes the processor to receive the BA from each of the different stations, receives the BA as a UL MU transmission.

14. The AP of claim 12, wherein the computer code that when executed causes the processor to receive the BA from each of the different stations, receives the BA as a UL Multiple Input Multiple Output (MIMO) transmission.

15. The AP of claim 12, wherein the memory includes computer code that when executed further causes the processor to, prior to transmission of the multi-VAP multi-station BAR and prior to the receipt of the BA from each of the different stations, wait for initiation of a short interframe space (SIFS) time period.

16. The AP of claim 12, wherein the memory includes computer code that when executed further causes the processor to transmit the multi-VAP multi-station BAR message as an A-MPDU frame.

17. The AP of claim 11, wherein the memory includes computer code that when executed further causes the processor to, prior to transmission of the A-MPDU frame, transmit an aggregated null data packet announcement (NDPA) message to each of the different stations to initiate a channel sounding procedure.

18. The AP of claim 15, wherein the memory includes computer code that when executed further causes the processor to transmit a NDP frame prompting calculation, by each of the different stations, respective feedback matrices from which steering matrices for transmission to each of the different stations are determined by the AP.

19. The AP of claim 16, wherein the memory includes computer code that when executed further causes the processor to transmit an aggregated beamforming report poll (BFRP) frame.

20. The AP of claim 17, wherein the memory unit includes computer code that when executed further causes the processor to receive, in response to the NDPA message, NDP frame, and BFRP frame, a compressed beamforming report (BFR) from each of the different STAs.

* * * * *